(12) United States Patent
Birdwell

(10) Patent No.: US 7,897,831 B2
(45) Date of Patent: Mar. 1, 2011

(54) METHOD FOR SOLIDIFYING HIGH MOISTURE SLUDGE, SOLIDIFIED SLUDGE THEREFROM

(75) Inventor: Steven Birdwell, Houston, TX (US)

(73) Assignee: Remedial Construction Services, LP

( * ) Notice: Subject to any disclaimer, the term of this patent is extended or adjusted under 35 U.S.C. 154(b) by 711 days.

(21) Appl. No.: 11/833,698

(22) Filed: Aug. 3, 2007

(65) Prior Publication Data
US 2009/0036728 A1     Feb. 5, 2009

(51) Int. Cl.
*A62D 3/33*     (2007.01)
(52) U.S. Cl. ........................................ 588/315; 588/405
(58) Field of Classification Search .................. 588/315, 588/405
See application file for complete search history.

(56) References Cited

U.S. PATENT DOCUMENTS

| 5,484,479 A | 1/1996 | Weber |
| 6,808,562 B2 | 10/2004 | Bland |

*Primary Examiner* — Edward M Johnson
(74) *Attorney, Agent, or Firm* — Robert W. Strozier

(57) ABSTRACT

A method for treating a high water content sludge is disclosed, where the method includes mixing into the high water content sludge, an effective amount of an ash composition. The effective amount of the ash composition is sufficient to convert a portion of the sludge and the ash composition into a treated sludge including an amount of a solidifying matrix to impart properties to a depth of the sludge sufficient to support commercial construction equipment. A treated sludge and sludge pits are also disclosed as is the ash composition used to form the treated sludge.

17 Claims, 3 Drawing Sheets

METHOD FOR SOLIDIFYING HIGH MOISTURE SLUDGE, SOLIDIFIED SLUDGE THEREFROM

BACKGROUND OF THE INVENTION

1. Field of the Invention

The present invention relates to a method for solidifying high moisture content sludge or other solid materials have undesirably high moisture content and to solidified sludge compositions.

More particularly, the present invention relates to a method for solidifying high moisture content sludge or other solid materials have undesirably high moisture content, where the method includes the step mixing an effective amount of an ash composition into the sludge, where the effective amount of the ash composition is sufficient to convert a portion of the sludge and a portion of the ash composition into a treated sludge composition including a solidifying amount of a matrix capable of absorbing or coordinating a large number of moles of water per mole of the matrix. The present invention also relates to solidified sludge compositions.

2. Description of the Related Art

U.S. Pat. No. 6,808,562 to Bland relates to ash consolidation, where compounds such as ettringite present problems with such ash consolidations.

U.S. Pat. No. 5,484,479 to Weber relates to fly ash reclaiming where part of the fly ash composition may form ettringite or other similar minerals, which are then combined with water, soil nutrients, and the like to form a soil-like mixture.

Although many methods and compositions have been used to reclaim sludge or other solid materials that have undesirably high moisture contents, there is still an need in the art for methods and compositions for solidifying sludge or other solid materials having undesirably high moisture contents to form treated compositions including a solidifying matrix capable of absorbing or coordinating a large number of moles of water per mole of a formed solidifying matrix and where the treated compositions are capable of supporting the weight of commercial construction equipment.

DEFINITIONS USED IN THE INVENTION

The term "sludge" mean any material that includes particulate solids and a high water content and is capable of forming a matrix of this invention, when a sufficient amount of an ash composition is mixed into the sludge.

The term "matrix" means a mineral composition having a known or mixture of known mineral crystal structures such as ettringite or similar calcium sulfate minerals.

SUMMARY OF THE INVENTION

Treated Sludge Compositions

The present invention provides a treated sludge composition including a sludge or other solid material having an undesirably high moisture content and an amount of an ash composition sufficient to convert a portion of the sludge and the ash composition into a treated sludge composition including a solidifying amount of a solidifying matrix. The solidifying amount of the matrix is sufficient to impart properties to the treated sludge so that a desired depth of treated sludge is capable of supporting the weight of commercial construction equipment. Beside solidifying the sludge, the matrix is also capable of taking up, absorbing and/or coordinating a large number of moles of water per mole of matrix formed. In most embodiments, the matrix comprises a calcium aluminum sulfate matrix. However, the matrix can also include other matrices such as calcium silicon sulfate carbonate matrices as well as other matrices that form during the mixing of a sludge and an ash compositions. The exact matrix composition, moreover, will depend on the sludge composition, the ash composition, the nature of the solidified sludge that is desired, the pH and/or other physical and chemical properties of the sludge and the ash composition. The depth generally needed to support commercial construction equipment is at least 5 feet. In certain embodiments, the depth is between about 5 feet and about 20 feet. However, depending on the nature of the sludge and the ash, the depth can be more or less. In certain embodiments, the depth is the depth of the sludge pit, i.e., the user may desire that the entire depth of the sludge be treated.

The present invention also provides a reclaimed sludge pit including a sludge and an amount of an ash composition sufficient to convert a portion of the sludge and the ash composition into a treated sludge composition including a solidifying amount of a solidifying matrix. The solidifying amount of the matrix is sufficient to impart properties to the treated sludge so that a desired depth of treated sludge is capable of supporting the weight of commercial construction equipment. Beside solidifying the sludge, the matrix is also capable of taking up, absorbing and/or coordinating a large number of moles of water per mole of matrix formed. In most embodiments, the matrix comprises a calcium aluminum sulfate matrix. However, the matrix can also include other matrices such as calcium silicon sulfate carbonate matrices as well as other matrices that form during the mixing of a sludge and an ash compositions. The exact matrix composition, moreover, will depend on the sludge composition, the ash composition, the nature of the solidified sludge that is desired, the pH and/or other physical and chemical properties of the sludge and the ash composition. The depth generally needed to support commercial construction equipment is at least 5 feet. In certain embodiments, the depth is between about 5 feet and about 20 feet. However, depending on the nature of the sludge and the ash, the depth can be more or less. In certain embodiments, the depth is the depth of the sludge pit, i.e., the user may desire that the entire depth of the sludge be treated.

The present invention also provides a reclaimed sludge pit including a top layer including a sludge and an amount of an ash composition sufficient to convert a portion of the top layer and the ash composition into a treated top sludge composition including a solidifying amount of a solidifying matrix. The solidifying amount of the matrix is sufficient to impart properties to the treated sludge so that a desired depth of treated sludge is capable of supporting the weight of commercial construction equipment. Beside solidifying the sludge, the matrix is also capable of taking up, absorbing and/or coordinating a large number of moles of water per mole of matrix formed. In most embodiments, the matrix comprises a calcium aluminum sulfate matrix. However, the matrix can also include other matrices such as calcium silicon sulfate carbonate matrices as well as other matrices that form during the mixing of a sludge and an ash compositions. The exact matrix composition, moreover, will depend on the sludge composition, the ash composition, the nature of the solidified sludge that is desired, the pH and/or other physical and chemical properties of the sludge and the ash composition. The depth generally needed to support commercial construction equipment is at least 5 feet. In certain embodiments, the depth is between about 5 feet and about 20 feet. However, depending on the nature of the sludge and the ash, the depth can be more or less. In certain embodiments, the depth is the depth of the sludge pit, i.e., the user may desire that the entire depth of the sludge be treated.

As a result of the formation of the treated top layer, the weight of the treated top layer is increased. The increased weight of the treated top layer via the action of gravity results in a gravity induced dewatering process of the bottom layer. Although the bottom layer water can be forced out of the sludge into the adjacent environment, in many embodiments, holes are drilled through the top layer into the bottom layer to facilitate dewatering, such holes are known to produce water as dewatering starts and continues. Although a single hole can be used, in most application, a plurality of holes are used and often the holes are set out in a desired pattern. Additionally, the dewatering generally also results in a significant reduction in bottom layer depth. Thus, the pit depth is known to undergo a significant reduction evidenced by the top layer sinking until the bottom layer achieves a stable depth or dewatered depth. The final stable pit, then comprises a treated top layer including the solidifying matrix and a consolidated bottom layer.

In certain embodiments of the above described compositions, the matrix comprises ettringite or one of its alternate forms or mixtures or combinations thereof.

Methods for Treating a High Moisture Content Sludge

The present invention provides a method including the step of mixing, into a sludge, an amount of an ash composition sufficient to convert a portion of the sludge and the ash composition into a treated sludge composition including a solidifying amount of a solidifying matrix. The solidifying amount of the matrix is sufficient to impart properties to the treated sludge so that a desired depth of treated sludge is capable of supporting the weight of commercial construction equipment. During matrix formation, the matrix takes up, absorbs and/or coordinates a large number of moles of water per mole of matrix formed. In most embodiments, the matrix comprises a calcium aluminum sulfate matrix. However, the matrix can also include other matrices such as calcium silicon sulfate carbonate matrices as well as other matrices that form during the mixing of the sludge and ash compositions. The exact matrix composition, moreover, will depend on the sludge composition, the ash composition, the nature of the solidified sludge that is desired, pH or other physical and chemical properties. The depth generally needed to support commercial construction equipment is at least 5 feet. In certain embodiments, the depth is between about 5 feet and about 20 feet. However, depending on the nature of the sludge and the ash, the depth can be more or less. In certain embodiments, the depth is the depth of the sludge pit, i.e., the user may desire that the entire depth of the sludge be treated.

The present invention also provides a method including the step of mixing, into a top part of a sludge in a sludge pit, an amount of an ash composition sufficient to convert a portion of the sludge and the ash composition into a treated sludge composition including a solidifying amount of a solidifying matrix. The solidifying amount of the matrix is sufficient to impart properties to the treated sludge so that a desired depth of treated top layer is capable of supporting the weight of commercial construction equipment. During matrix formation, the matrix takes up, absorbs and/or coordinates a large number of moles of water per mole of matrix formed. In most embodiments, the matrix comprises a calcium aluminum sulfate matrix. However, the matrix can also include other matrices such as calcium silicon sulfate carbonate matrices as well as other matrices that form during the mixing of the sludge and ash compositions. The exact matrix composition, moreover, will depend on the sludge composition, the ash composition, the nature of the solidified sludge that is desired, pH or other physical and chemical properties. The depth generally needed to support commercial construction equipment is at least 5 feet. In certain embodiments, the depth is between about 5 feet and about 20 feet. However, depending on the nature of the sludge and the ash, the depth can be more or less.

In certain embodiments of the above described methods, the matrix formed comprises ettringite or one of its alternate forms or mixtures or combinations thereof.

Ash Composition Used in Treating a High Moisture Content Sludge

The present invention provides an ash composition including an ash having a sulfate effective amount of a sulfate precursor, a calcium effective amount of a calcium precursor and an aluminum effective amount of an aluminum precursor, where the effective amounts are sufficient when mixed with a target sludge to form a solidifying matrix capable of taking up, absorbing and/or coordinating a large number of moles of water per mole of matrix.

The present invention provides an ash composition including an sulfate amount of a sulfate containing ash, a calcium amount of a calcium containing ash and an aluminum amount of an aluminum-containing ash, where the amounts are sufficient when mixed with a target sludge to form a calcium aluminum sulfate matrix capable of taking up to about 10 moles of water per mole of matrix up to as much as 50 moles of water per mole of matrix or more.

In certain embodiments of the above described ash compositions, the matrix formed comprises ettringite or one of its alternate forms or mixtures or combinations thereof.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1A:
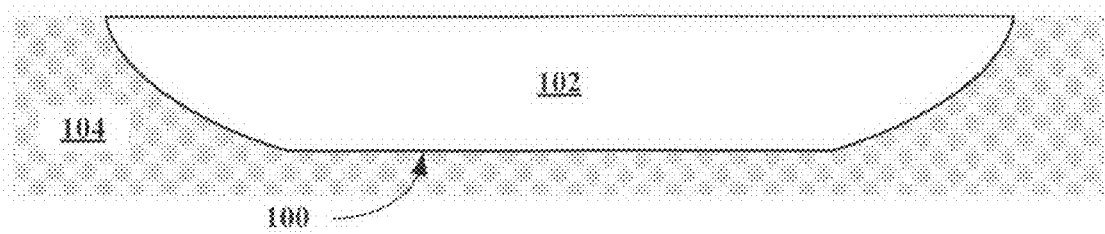
FIGS. 1A-C depicts a sludge pit before, immediately after and during bottom layer consolidation a top part of the sludge in the pit has been treated according to this invention.

The inventor has found that an ash composition can be formulated for mixing with a sludge to produce a solidified or treated sludge composition including a sufficient amount of a solidifying matrix. The sufficient amount of the matrix imparts properties to the treated sludge so that at a desired depth, the treated sludge is capable of supporting the weight of commercial construction equipment. During matrix formation, the matrix is taking up, absorbing and/or coordinating a large number of moles of water per mole of matrix formed. In most embodiments, the matrix comprises a calcium aluminum sulfate matrix. However, the matrix can also include other matrices such as calcium silicon sulfate carbonate matrices as well as other matrices that form during the mixing of the sludge and ash compositions. The exact matrix composition, moreover, will depend on the sludge composition, the ash composition, the nature of the solidified sludge that is desired, pH or other physical and chemical properties. The depth generally needed to support commercial construction equipment is at least 5 feet. In certain embodiments, the depth is between about 5 feet and about 20 feet. However, depending on the nature of the sludge and the ash, the depth can be more or less. In certain embodiments, the depth is the depth of the sludge pit, i.e., the user may desire that the entire depth of the sludge be treated.

The inventor also has found that by analyzing the composition of the sludge, an ash composition can be formulated that when mixed into the sludge produces a treated sludge including a solidifying matrix, where the treated sludge is capable of supporting the weight of commercial construction equipment at a desired treated depth and is capable of taking up, absorbing or coordinating a large number of moles of water per mole of matrix formed.

The present invention broadly relates to a solidified or treated sludge composition including a sludge and an amount of an ash composition sufficient to convert a portion of the sludge and the ash composition into the treated sludge. The treated sludge includes an amount of a solidifying matrix sufficient for solidifying the sludge so that at a desired depth of treated sludge, the treated sludge can support the weight of commercial construction equipment. The matrix is also capable of taking up, absorbing, or coordinating a large number of moles of water per mole of formed matrix. In certain embodiments, the treated sludge composition comprises only a top portion of a sludge pit, where the solidified top layer is capable of supporting the weight of commercial construction equipment. Once the top layer has been solidified with the addition of the ash composition, the weight of the solidified top layer pushes on the moisture rich bottom layer through the force of gravity. This process results in the dewatering and consolidation of the bottom layer and a reduction in the overall depth of the pit due to the consolidation. Thus, after a period of time, the entire pit will be consolidated and will include a top layer comprising the treated sludge of this invention and a consolidated bottom layer. Once sufficient stabilized, the pit is reclaimed and capable of supporting plant and/or animal life.

The present invention also broadly relates of a method for solidifying a sludge including the step of mixing into a sludge an amount of an ash composition sufficient to convert a portion of the sludge and the ash composition into a treated sludge composition including a solidifying amount of a solidifying matrix. The solidifying amount of the matrix is sufficient to impart properties to the treated sludge so that a desired depth of treated sludge is capable of supporting the weight of commercial construction equipment. During matrix formation, the matrix takes up, absorbs and/or coordinates a large number of moles of water per mole of matrix formed. In most applications, the depth of treated sludge will result in a solidified top layer, which via the action of gravity will result in the dewatering and consolidation of the untreated sludge. After a period of time, the sludge will stabilize into a treated sludge, generally including a treated top portion and a consolidated bottom portion. However, the treated portion can represent the entire depth of the sludge.

In certain embodiments, the matrix includes a calcium aluminum sulfate matrix. In other embodiment, the matrix includes a mixture of a calcium aluminum sulfate matrix and a calcium silicon sulfate carbonate matrix. In other embodiments, the matrix comprises a calcium silicon sulfate carbonate matrix. The exact composition of the matrix will of course depend on the sludge, the ash used to treated the sludge and on the nature of the treated sludge desired. Calcium aluminum sulfate matrices are capable of taking up, absorbing or coordinating large numbers of moles of water per mole of formed matrix. For ettringite type calcium aluminum sulfate matrices, the matrix can take up, absorb or coordinated up to 26 moles of water per mole of formed matrix. The exact amount of water taken up by a calcium aluminum sulfate composition depends on pH, with erringite type matrixes forming a high pH (greater than pH 7). The other calcium aluminum sulfate composition, while usable, have less advantageous properties than a erringite matrix.

The method steps of adding or mixing the ash into the sludge can be accomplished by any technique currently used or yet invented, but generally the adding is accomplished by using trucks and other heavy equipment to transport and dispense the ash onto the top of the sludge. Mixing is then accomplished by augers, graters, other heavy equipment capable mixing the ash composition into the sludge. The heavy equipment can also include equipment that both add and mix the ash composition into the sludge. The equipment can also excavate a portion of the sludge and mix it with the appropriate amount of ash and replaced on the excavated portion. Such heavy earth moving and mixing equipment is well known in the art and commercially available from well known manufacturers including Ashland Industries, Inc., Wisconsin, USA.; AUSA: Automóviles Utilitarios, S.A., Manresa, Spain; Badger Equipment Co.-Minnesota, USA; BayLynx Manufacturing, Inc., And beam camber machines, Curtainsider taut trailer sides. Photos show normal usage. Ontario, Canada; Bell Equipment Co., Natal, South Africa; Bobcat Co., North Dakota, USA; Brown Bear Corp., Iowa, USA; Bucyrus International, Inc., Wisconsin, USA; Bullhorn Industries, Ltd., British Columbia, Canada; Cad Design +, Ontario, Canada; Case Corp., Wisconsin, USA; Caterpillar, Inc., Illinois, USA; Charles Machine Works, Inc., Oklahoma, USA; China Machinery & Equipment Imp. & Exp. Suzhou Co., Ltd.; Cleveland Trencher Co., Ohio, USA; CNH Global N.V., Illinois, USA; Daewoo Heavy Industries & Machinery Ltd.; Dalla Bona, Brescia, Italy; Deere & Company, Illinois, USA; Delta Machine Products, Inc., Georgia, USA; Dickins McLeod, New South Wales, Australia; Dingo Mini Diggers, Dalby, Australia; Dorfman Construction Co., Inc., California, USA; Durga Tractors, Gujarat, India; Euromach Srl, Montichiari/BS, Italy; Fiatallis North America, Inc.-. Illinois, USA; Gehl Company, Inc., Wisconsin, USA; Gopher Power Shovels of Canada, Inc., British Columbia, Canada; Gradall Industries, Inc., Ohio, USA; Gyro-Trac USA, Inc.; Highway Manufacturing, Minnesota, USA; Hitachi Construction Machinery Co., Ltd., Nihongo. Tokyo, Japan; Hitachi: John Deere, Illinois, USA; Tokyo, Japan; Hyundai Heavy Industries Co., Ltd., Equipment model list, Construction Equipment page, on main HHI website. English, Hangul. Ulsan, Korea; Hyundai Heavy Industries Co., Ltd.: Construction Equipment Division, Ulsan, Korea; Ingersoll Equipment Co., Inc., Wisconsin, USA; JCB, Staffordshire, UK; Kaiser AG, Liechtenstein; Komatsu America International Co., Illinois, USA; Komatsu, Ltd., Tokyo, Japan; Komatsu Utility Corp., Illinois, USA; Kubota Corp., Osaka, Japan; Kubota Tractor Corp. U.S.A., California, USA; LBX Company LLC, Kentucky, USA; Liebherr-Holding GmbH, Germany; Longgong Group Co., Ltd., Hong Kong, China; MachineDrivers.com, Derbyshire, UK; Moxy Trucks AS, Elnesvågen, Norway; Neuson Baumaschinen GmbH, Linz, Austria; New Holland N.V., Illinois, USA; O&K Orenstein & Koppel AG, Berlin, Germany; Powertrans Pty. Ltd., Queensland, Australia; RAM Enterprises, Colorado, USA; Ramrod Equipment, Inc., North Dakota, USA; Rimpull Corp., Kansas, USA; Roadrunner Construction Equipment, Maryland, USA; SerVac, Omega Tools, Pennsylvania, USA; Shenyang Shanhe Construction Machinery Works; Shinheung Industry Co., Chonbuk, Korea; Steiger Manufacturing, Inc., Minnesota, USA; Susumo Engineering, Maharashtra, India; Takeuchi U.S., Georgia, USA; Telescopelle SA; Terex Corp.: Earthmoving Division, Connecticut, USA; Terex Mining: Terex Germany GmbH & Co. KG, Dortmund, Germany; Terramite Corp., West Virginia, USA; Trail King Industries, South Dakota, USA; Transport & Construction, Cape Town, South Africa; Ubuilditplans.com, Massachusetts, USA; Volvo Construction Equipment, Brussels, Belgium; Volvo Motor Graders, Ontario, Canada; Waldon, Oklahoma, USA; Way Industry, j.-s. Co. a.s., Russia; Weidemann GmbH & Co. KG Maschinenfabrik, Diemelsee-Flechtdorf, Germany; Yuasa Trading Deutschland GmbH, Gross-Gerau, Germany; and Z Loader Corp., Indiana, USA.

Suitable Reagents

Suitable sludge for which the present invention can be practice include, without limitation, oil shale sludge, tar belts sludge, mining sludge, sludge types originating from refineries, chemical plants, mining operations, oil production facilities, smelters, and manufacturing or other commercial or industrial operations that generate a sludge, or mixtures or combinations thereof. Exemplary non-limiting examples include storm water basin sludge and sediments, process water settling basin sludge and sediments, API separator sludge, tank bottoms sludge, dredge spoils, spent lime wastes, waste streams from oil recovery process from "oil sands", oxidation pond sludge and sediments, contaminated sediments in bayous, rivers, ponds, and lakes or other similar sludge or mixtures or combinations thereof.

Suitable ashes for use in this invention include, without limitation, ashes high in alumina such as alumina silicates, alumina, etc.; ashes high in sulfate such as calcium sulfite ($CaSO_3$) including hannebachite, ashes formed during flue gas desulfurization, gypsum ($CaSO_4.2H_2O$) etc.; ashes high in calcium such as calcium carbonate, etc.; or any other type of ash or mixtures of ashes that include mix of ingredients sufficient to form a calcium aluminum sulfate matrix or mixtures or combinations thereof. Exemplary ashes include, without limitation, bed ash from a fluidized bed power plant facility, fly ash from a fluidized bed power plant facility, fly ash from a coal fired power plant facility, class C fly ash, class F fly ash, lime kiln dust, cement kiln dust, or similar ashes, or mixtures or combinations thereof.

Suitable matrices include, without limitation, calcium metal oxide sulfates matrices. Exemplary examples of suitable calcium metal oxide sulfates include, without limitation, Ettringite ($Ca_6Al_2(SO_4)_3(OH)_{12}.26H_2O$), Thaumasite ($Ca_3Si(CO_3)(SO_4)(OH)_6.12H_2O$, hydrated calcium silicon carbonate sulfate hydroxide), Sturmanite ($Ca_6(Fe, Al, Mn)_2(SO_4)_2(B(OH)_4)(OH)_{12}.26H_2O$, hydrated calcium iron aluminum manganese sulfate tetrahydroxoborate hydroxide), Huangite ($Ca_{0.05}Al_3(SO_4)_2(OH)_6$), Minamiite (Na, Ca, K)$Al_3(SO_4)_2(OH)_6$), Creedite ($Ca_3Al_2(SO_4)(F,OH)_{12}.12H_2O$), calcium silicon sulfate carbonate ($Ca_3Si(OH)_6(CO_3)(SO_4).12H_2O$, or other similar calcium sulfate matrices that take up a large number of moles of water per mole of formed matrix mixtures or combinations thereof. In certain and most embodiments, the matrix comprises between about 5 wt. % and about 50 wt. % of ettringite. In other embodiments, the matrix comprises between about 10 wt. % and about 50 wt. % ettringite. In other embodiments, the matrix comprises between about 10 wt. % and about 40 wt. % ettringite. In other embodiments, the matrix comprises between about 10 wt. % and about 30 wt. % ettringite. In other embodiments, the matrix comprises between about 10 wt. % and about 20 wt. % ettringite. It should be recognized that the amount of ettringite in the matrix is some extent controlled by the percent of sulfate in the ash and sludge mixture. While in most embodiments, the use calcium sulfate matrices is preferred because these matrices take up large amounts of water during matrix formation, the ashes can be formulated to produce other matrices controlled only by the desire of the reclaimers and on the use to which the reclaimed land will be used.

Compositional Ranges

The present invention is designed to convert all or a portion of a sludge into a solidified sludge composition including a solidifying matrix such as a calcium aluminum sulfate matrix capable of absorbing a large number of moles of water per mole of formed matrix, such as up to 26 moles of water per mole of formed matrix for calcium aluminum sulfate matrices. The sludge is mixed with an effective amount of an ash composition, where the effective amount is sufficient to produce a matrix. The matrix solidifies the sludge so that a depth of the treated sludge is sufficient to support commercial construction equipment. Based on the sludge composition, the ash composition will include a sulfate-containing precursor, a calcium-containing precursor and an aluminum-containing precursor, in amounts sufficient that when mixed with the sludge renders a sludge/ash composition capable of forming a solidifying amount of a solidifying matrix having sufficient strength so as to support commercial construction equipment at a desired treated sludge depth. Beside rendering structural strength and stability to the sludge, as the matrix form it consumes large quantities of water—for each mole of formed matrix, a large number of moles of water are needed to form the resulting matrix. Thus, the treat sludge is dewatered by the process of forming the solidifying matrix from the sludge and added ash. The calcium aluminum sulfate matrix forming reaction is generally exothermic and is caused by mixing the ash composition into the sludge. The resulting composition is a solidified sludge including the solidifying matrix such as a calcium aluminum sulfate matrix, which is the material responsible for solidifying the sludge into a treated sludge and a reclaimed sludge pit. The amount and make up of ash composition to be added to the sludge will, therefore, depend on the type of sludge, i.e., its chemical make—up amount of calcium-containing precursors, sulfate-containing precursors, and aluminum-containing precursors. Of course, regardless of the sludge composition, an effective amount of an ash is still required to prompt the formation of a calcium aluminum sulfate matrix to solidify the sludge, even though portions of the sludge itself may enter into the matrix forming reaction during sludge ash mixing.

Generally, the ash composition is added into the sludge in an amount between about 1 wt. % and about 50 wt. % with the remainder being sludge, i.e., the treated sludge composition includes between about 99 wt. % sludge and about 50 wt. % sludge and between about 1 wt. % and about 50 wt. % ash composition. In certain embodiments, the treated sludge composition includes between about 99 wt. % sludge and about 60 wt. % sludge and between about 1 wt. % and about 40 wt. % ash composition. In other embodiments, the treated sludge composition includes between about 99 wt. % sludge and about 70 wt. % sludge and between about 1 wt. % and about 30 wt. % ash composition. In other embodiments, the treated sludge composition includes between about 95 wt. % sludge and about 75 wt. % sludge and between about 5 wt. % and about 25 wt. % ash composition. In other embodiments, the treated sludge composition includes between about 95 wt. % sludge and about 80 wt. % sludge and between about 5 wt. % and about 20 wt. % ash composition. It should be recognized that these are just guideline amount, with the actual amount depending on the nature of the sludge (e.g., its water content, its pH, its depth, etc.), the ash composition used, the desired matrix to be formed, and the treated sludge composition desired. Thus, generally the ash will be added in an amount sufficient to achieve a desired degree of sludge dewatering (matrix absorbs an amount of water to achieve a desired degree of water coordination converting free water to water making up the matrix such as a ettringite matrix, which takes up 26 moles of water per mole of formed matrix).

DETAILED DESCRIPTION OF THE DRAWINGS

Figure 1B:
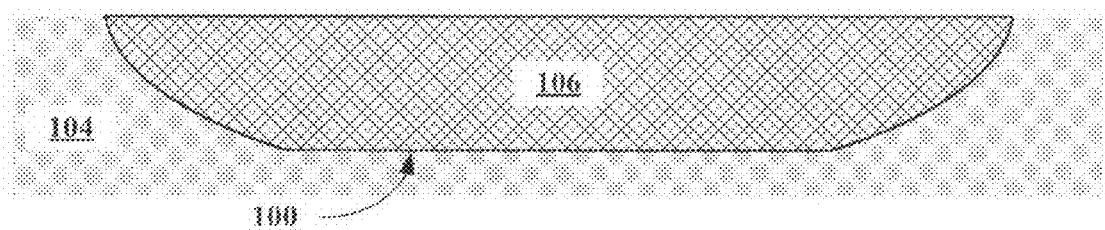
Figure 1C:
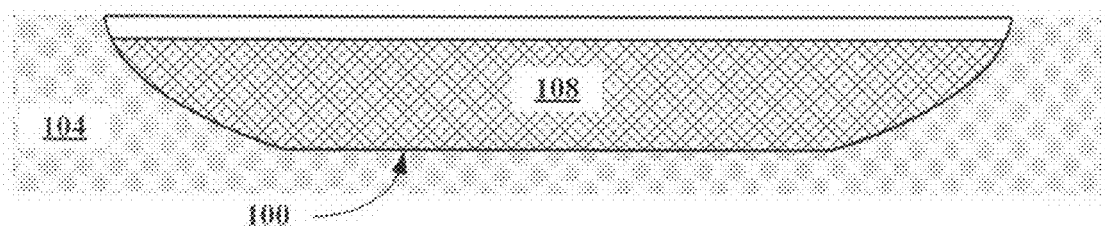

Referring now to FIGS. 1A-C, an illustration of an embodiment of the method of this invention, where a sludge pit containing a sludge is solidifying using an ash composition of this invention. Looking at FIG. 1A, a sludge pit 100 including a sludge 102 located in an formation 104 (any portion of dry land including a sludge pit) is shown. Looking at FIG. 1B, an ash composition of this invention has been added to convert the sludge 102 into a treated sludge 106 including an amount of a solidifying matrix sufficient to form a solidified sludge/ash composition. Looking at FIG. 1C, after time, the treated sludge 106 further compacts or consolidates to form a stable, treated sludge 108 generally having a smaller volume than the untreated sludge 102. Although the exact nature of the treated sludge on a microscope scale is not known, the matrix can comprise a portion of the ash and the sludge surrounding, encasing and/or embedding the matrix, the treated composition can comprise domains of the matrix and domains of the sludge, ash or mixtures thereof, where the sludge was been dewatered and consolidated by the water absorbed during matrix formation, or the treated composition can be of any other microscopic form provided that there is sufficient matrix render a depth of the treated sludge composition capable of being driven on by commercial construction equipment.

Figure 2A:
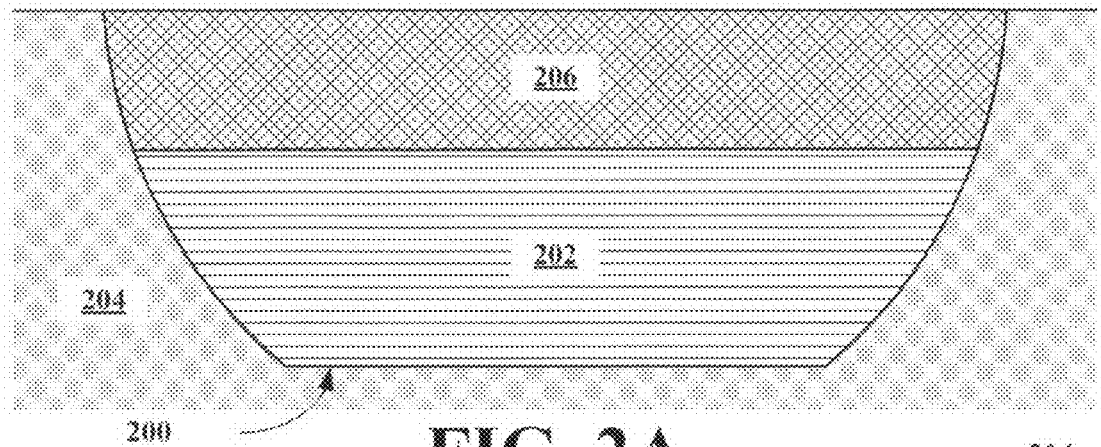
FIGS. 2A-C depicts several illustrations of matrices that may form during sludge treatment according to this invention.
Figure 2B:
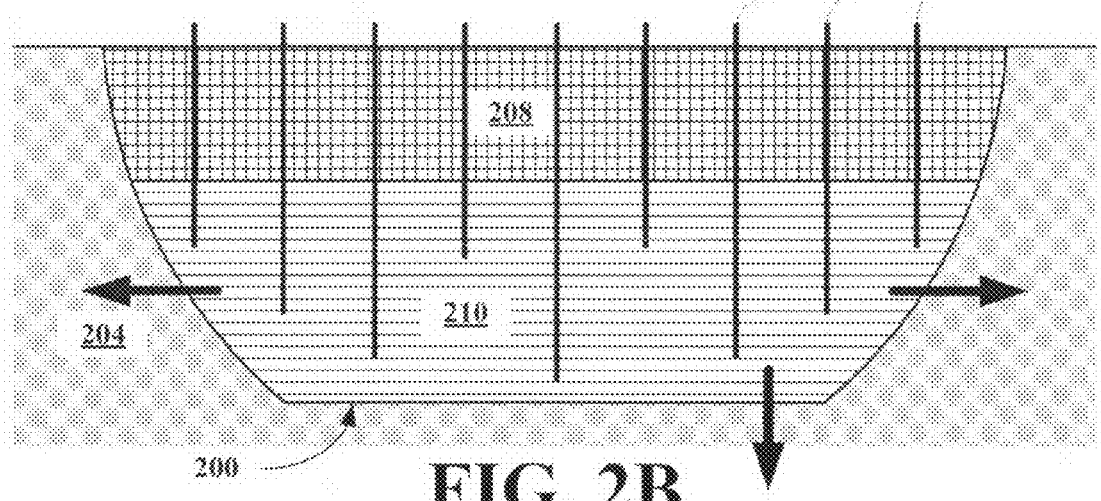
Figure 2C:
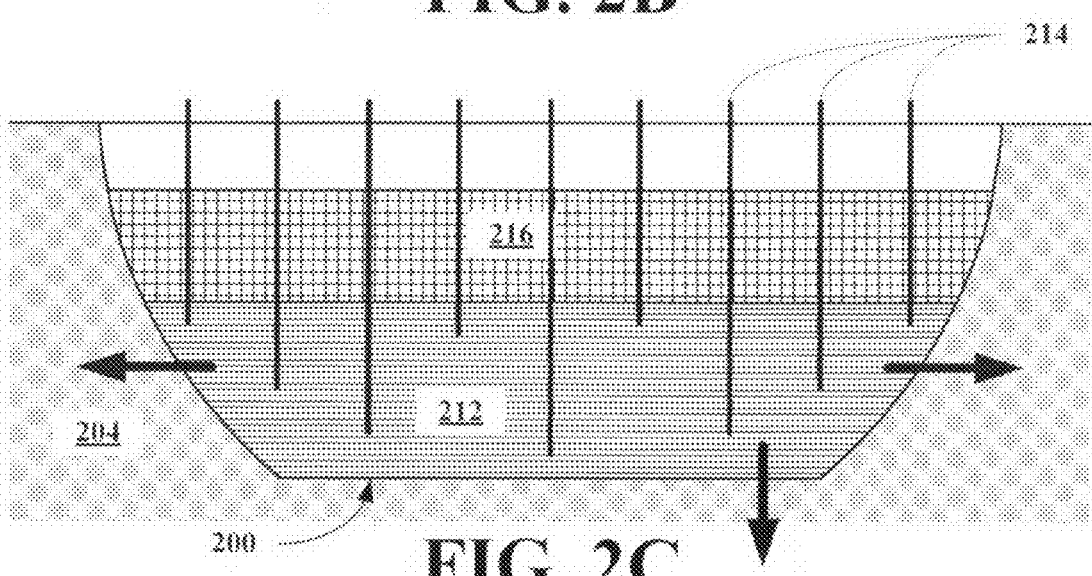

Referring now to FIGS. 2A-C, an illustration of another embodiment of the method of this invention, where a sludge pit containing a sludge is solidifying using an ash composition of this invention. Looking at FIG. 2A, a sludge pit 200 including a sludge 202 located in an formation 204 (any portion of dry land including a sludge pit) is shown. Looking at FIG. 2B, an ash composition of this invention has been added to convert a top portion 206 of the sludge 202 into a treated top layer 208 including an amount of a solidifying matrix sufficient to form a solidified sludge/ash composition as shown in FIG. 1D; while a bottom portion or layer 210 of the sludge pit 200 remains untreated. Looking at FIG. 2C, the treated top layer 208 increases the gravitation force acting on the bottom layer 210, and over time, the increased gravitational force causes the bottoms layer 210 to be dewatered and consolidated to form a consolidated bottom layer 212. The dewatering can be into the formation as indicated by the three heavy arrows or via dewatering pipes 214. As is true in the case of FIG. 1A-C, over time, the top layer 208 can also consolidate and compact to from a reduced thickness treated top layer 216. As a result of any compaction of the top layer 208 and the consolidation of the bottom layer 210, the thickness of the sludge in the pit 200 is reduced as shown in FIG. 2C.

Referring now to FIGS. 2A-C, an illustration of another embodiment of the method of this invention, where a sludge pit containing a sludge is solidifying using an ash composition of this invention. Looking at FIG. 2A, a sludge pit 200 including a sludge 202 located in an formation 204 (any portion of dry land including a sludge pit) is shown. Looking at FIG. 2B, an ash composition of this invention has been added to convert a top portion 206 of the sludge 202 into a treated top layer 208 including an amount of a solidifying matrix sufficient to form a solidified sludge/ash composition; while a bottom portion or layer 210 of the sludge pit 200 remains untreated. Looking at FIG. 2C, the treated top layer 208 increases the gravitation force acting on the bottom layer 210, and over time, the increased gravitational force causes the bottoms layer 210 to be dewatered and consolidated to form a consolidated bottom layer 212. The dewatering can be into the formation as indicated by the three heavy arrows or via dewatering pipes 214. As is true in the case of FIG. 1A-C, over time, the top layer 208 can also consolidate and compact to from a reduced thickness treated top layer 216. As a result of any compaction of the top layer 208 and the consolidation of the bottom layer 210, the thickness of the sludge in the pit 200 is reduced as shown in FIG. 2C.

Figure 3A:
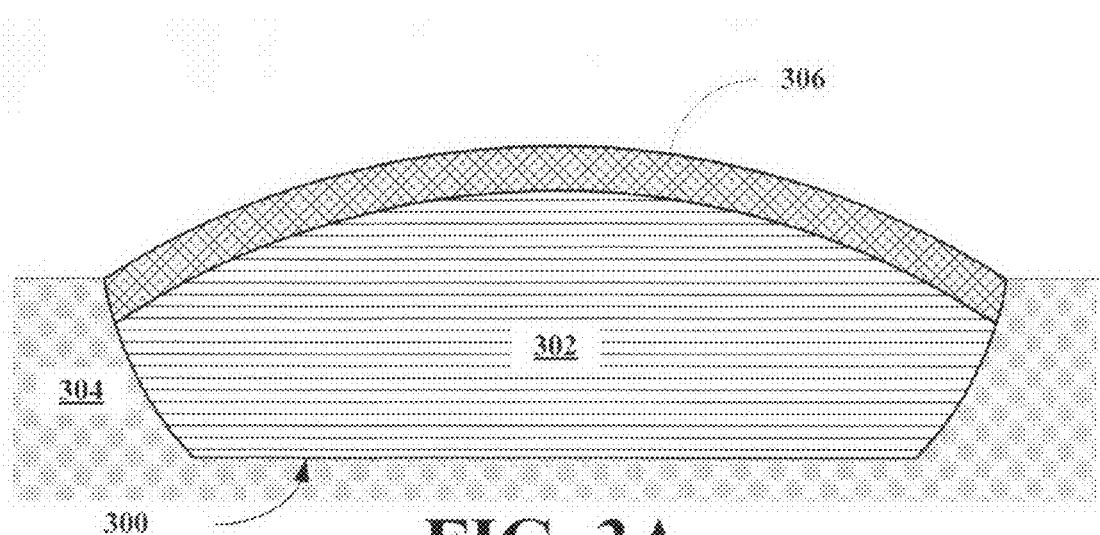
FIGS. 3A-C depict an embodiment of the method of this invention, where a sludge pit containing a sludge is solidifying using an ash composition of this invention.
Figure 3B:
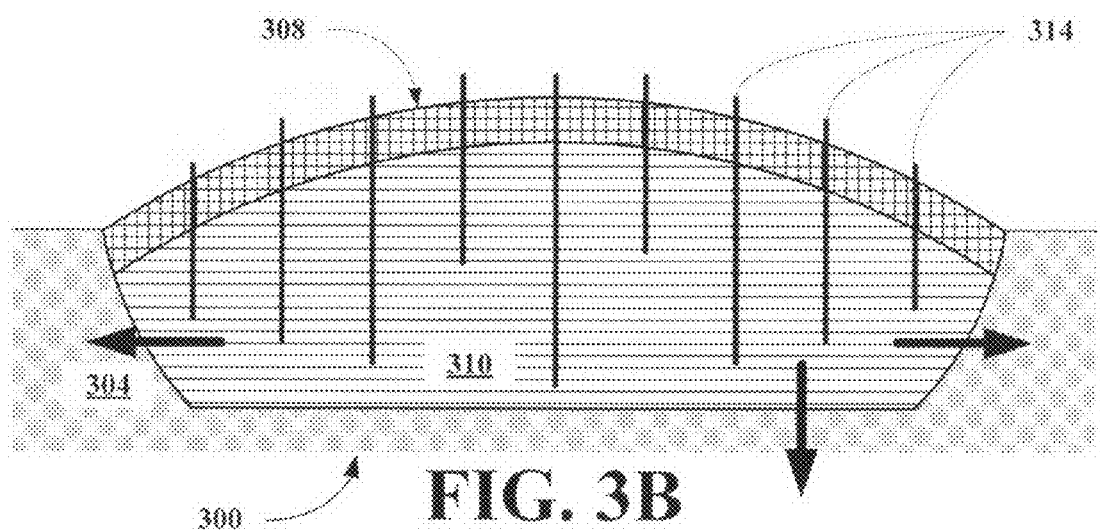
Figure 3C:
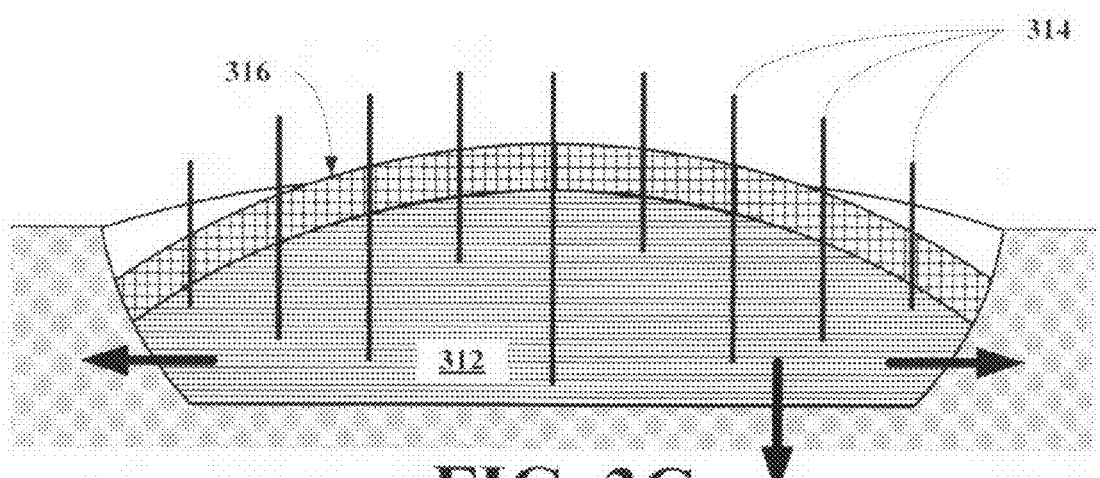

Referring now to FIGS. 3A-C, an illustration of another embodiment of the method of this invention, where a sludge pit containing a sludge is solidifying using an ash composition of this invention. Looking at FIG. 3A, a mounted sludge pit 300 including a sludge 302 located in an formation 304 (any portion of dry land including a sludge pit) is shown. Looking at FIG. 3B, an ash composition of this invention has been added to convert a top portion 306 of the sludge 302 into a treated top layer 308 including an amount of a solidifying matrix sufficient to form a solidified sludge/ash composition; while a bottom portion or layer 310 of the sludge pit 300 remains untreated. Looking at FIG. 3C, the treated top layer 308 increases the gravitation force acting on the bottom layer 310, and over time, the increased gravitational force causes the bottoms layer 310 to be dewatered and consolidated to form a consolidated bottom layer 312. The dewatering can be into the formation as indicated by the three heavy arrows or via dewatering pipes 314. As is true in the case of FIG. 1A-C, over time, the top layer 308 can also consolidate and compact to from a reduced thickness treated top layer 316. As a result of any compaction of the top layer 208 and the consolidation of the bottom layer 310, the thickness of the sludge in the pit 300 is reduced as shown in FIG. 3C.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

I claim:

1. A treated sludge composition comprising:
   a sludge having a high water content, and
   an effective amount of an ash composition, where the amount is sufficient to convert a portion of the sludge and the ash composition into a treated sludge composition including a solidifying amount of a solidifying matrix and where the solidifying amount of the matrix is sufficient to impart properties to the treated sludge so that the treated sludge is capable of supporting the weight of commercial construction equipment and where the matrix takes up, absorbs and/or coordinates a large number of moles of water per mole of matrix formed, where the large number of moles of water is between about 10 moles of water per mole of matrix and about 50 moles of water per mole of matrix.

2. The composition of claim 1, wherein the ash composition is added only to a top portion of the sludge to form a treated top layer and a consolidated bottom layer, where a depth of the treated top layer is sufficient to support the weight of the commercial construction equipment and the bottom layer is dewatered and consolidated due to a weight of the treated top layer.

3. The composition of claim 1, further comprising a wherein matrix comprises a calcium metal oxide sulfate matrix.

4. The composition of claim 3, wherein the calcium metal oxide sulfate matrix is selected from the group consisting of Ettringite ($Ca_6Al_2(SO_4)_3(OH)_{12} \cdot 26H_2O$), Thaumasite ($Ca_3Si(CO_3)(SO_4)(OH)_6 \cdot 12H_2O$, hydrated calcium silicon carbonate sulfate hydroxide), Sturmanite ($Ca_6(Fe, Al, Mn)_2(SO_4)_2(B(OH)_4)(OH)_{12} \cdot 26H_2O$, hydrated calcium iron aluminum manganese sulfate tetrahydroxoborate hydroxide), Huangite ($Ca_{.05}Al_3(SO_4)_2(OH)_6$), Minamiite ($(Na,Ca,K)Al_3(SO_4)_2(OH)_6$), Creedite ($Ca_3Al_2(SO_4)(F,OH)_{12} \cdot 12H_2O$), calcium silicon sulfate carbonate ($Ca_3Si(OH)_6(CO_3)(SO_4) \cdot 12H_2O$, other similar calcium sulfate matrices that take up a large number of moles of water per mole of formed matrix, and mixtures or combinations thereof.

5. The composition of claim 1, wherein matrix comprises a calcium aluminum sulfate matrix.

6. The composition of claim 5, wherein the calcium aluminum sulfate matrix comprises a Ettringite ($Ca_6Al_2(SO_4)_3(OH)_{12} \cdot 26H_2O$) matrix.

7. The composition of claim 1, wherein the sludge is selected from the group consisting of an oil shale sludge, a tar belts sludge, a mining sludge, a sludge originating from refineries, chemical plants, mining operations, oil production facilities, smelters, and manufacturing or other commercial or industrial operations that generate a sludge, and mixtures or combinations thereof.

8. The composition of claim 1, wherein the sludge is selected from the group consisting of a storm water basin sludge and sediments, a process water settling basin sludge, an API separator sludge, a tank bottoms sludge, dredge spoils, a spent lime waste, a waste streams from oil recovery process from oil sand, a oxidation pond sludge, a contaminated sediment in bayous, rivers, ponds, and lakes or other similar sludge and mixtures or combinations thereof.

9. The composition of claim 1, wherein the ash composition comprises ashes high in alumina such as alumina silicates, ashes high in alumina, ashes high in sulfate, ashes high in calcium such as calcium carbonate, and mixtures or combinations thereof.

10. The composition of claim 1, wherein the ash composition comprises bed ash from a fluidized bed power plant facility, fly ash from a fluidized bed power plant facility, fly ash from a coal fired power plant facility, class C fly ash, class F fly ash, lime kiln dust, cement kiln dust, or similar ashes, or mixtures or combinations thereof.

11. The composition of claim 5, wherein the matrix comprises between about 5 wt. % and about 50 wt. % ettringite.

12. The composition of claim 5, wherein the matrix comprises between about 10 wt. % and about 50 wt. % ettringite.

13. The composition of claim 5, wherein the matrix comprises between about 10 wt. % and about 30 wt. % ettringite.

14. The composition of claim 5, wherein the matrix comprises between about 10 wt. % and about 20 wt. % ettringite.

15. The composition of claim 1, wherein the treated sludge composition comprises between about 99 wt. % sludge and about 50 wt. % sludge and between about 1 wt. % and about 50 wt. % ash composition.

16. The composition of claim 1, wherein the treated sludge composition comprises between about 95 wt. % sludge and about 75 wt. % sludge and between about 5 wt. % and about 25 wt. % ash composition.

17. The composition of claim 2, the depth is between about 5 feet and about 20 feet.

* * * * *